(12) United States Patent
Shen et al.

(10) Patent No.: US 11,702,511 B2
(45) Date of Patent: Jul. 18, 2023

(54) REACTIVE POLY(FLUOROALKYL-FUNCTIONAL SILOXANE) OLIGOMERS, PROCESS FOR FORMING THE SAME, AND COMPOSITIONS USING THE SAME

(71) Applicant: Momentive Performance Materials Inc., Waterford, NY (US)

(72) Inventors: Hao Shen, Verona, NJ (US); Antonio Chaves, Chappaqua, NY (US); Martin Wusik, Danbury, CT (US); Amy Hua McKinstry, Danbury, CT (US)

(73) Assignee: Momentive Performance Materials Inc., Waterford, NY (US)

( * ) Notice: Subject to any disclaimer, the term of this patent is extended or adjusted under 35 U.S.C. 154(b) by 221 days.

(21) Appl. No.: 17/072,160

(22) Filed: Oct. 16, 2020

(65) Prior Publication Data

US 2021/0115195 A1 Apr. 22, 2021

Related U.S. Application Data

(60) Provisional application No. 62/923,022, filed on Oct. 18, 2019.

(51) Int. Cl.
| | | |
|---|---|---|
| *C08G 77/24* | (2006.01) | |
| *C08G 77/385* | (2006.01) | |
| *C08G 77/08* | (2006.01) | |
| *C09D 183/08* | (2006.01) | |
| *C07F 7/08* | (2006.01) | |

(52) U.S. Cl.
CPC ........... *C08G 77/385* (2013.01); *C08G 77/08* (2013.01); *C09D 183/08* (2013.01); *C07F 7/081* (2013.01); *C07F 7/0836* (2013.01)

(58) Field of Classification Search
CPC ......... C08G 77/24; C07F 7/081; C07F 7/0836
USPC ............................. 528/42; 556/457, 458, 459
See application file for complete search history.

(56) References Cited

U.S. PATENT DOCUMENTS

| | | | |
|---|---|---|---|
| 5,739,639 A | 4/1998 | Johnson | |
| 5,859,162 A | 1/1999 | Yamamoto et al. | |
| 7,897,667 B2 * | 3/2011 | Mabry | C08F 8/42 524/269 |
| 8,927,673 B2 * | 1/2015 | Hwang | C08G 77/08 528/14 |
| 9,249,313 B2 * | 2/2016 | Haddad | C07F 7/21 |
| 9,790,377 B2 * | 10/2017 | Haddad | C09D 5/1662 |
| 2004/0068074 A1 * | 4/2004 | Yoshida | C08G 77/045 528/10 |
| 2008/0221262 A1 * | 9/2008 | Mabry | C08F 8/42 524/588 |
| 2013/0072609 A1 * | 3/2013 | Haddad | C09D 5/1662 556/460 |
| 2013/0144025 A1 * | 6/2013 | Hwang | C08G 77/08 528/14 |
| 2015/0315443 A1 | 11/2015 | Takeda et al. | |
| 2016/0122558 A1 * | 5/2016 | Haddad | B05D 5/083 556/452 |
| 2018/0370994 A1 | 12/2018 | Vasei | |
| 2019/0177574 A1 | 6/2019 | Takeda | |

FOREIGN PATENT DOCUMENTS

| | | |
|---|---|---|
| EP | 1033395 A2 | 9/2000 |
| JP | H08245792 | 9/1996 |
| JP | 3598529 B2 | 12/2004 |
| KR | 100887573 B1 | 3/2009 |
| WO | 2013161829 A1 | 12/2015 |
| WO | 2019022855 A1 | 1/2019 |
| WO | 2019116189 A1 | 6/2019 |

OTHER PUBLICATIONS

International Search Report and Written Opinion dated Feb. 5, 2021; International Patent Application No. PCT/US2020/055901 filed on Oct. 16, 2020. ISA/EP.

* cited by examiner

*Primary Examiner* — Margaret G Moore
(74) *Attorney, Agent, or Firm* — James Abruzzo; McDonald Hopkins LLC

(57) ABSTRACT

Reactive poly(fluoroalkyl-functional siloxane) oligomers, method of making the same, and compositions comprising the same are shown and described herein. The reactive poly(fluoroalkyl-functional siloxane) oligomers are is derived from a hydrolysable fluoroalkyl-functional silanes. Coating compositions comprising reactive poly(fluoroalkyl-functional siloxane) oligomer(s) may be used to form a coating or a film on a substrate and impart hydrophobic and/or oleophobic properties. The reactive poly(fluoroalkyl-functional siloxane) oligomer are more hydrophobic and oleophobic and show better chemical resistance than the hydrolysable fluoroalkyl-functional silane.

17 Claims, No Drawings

REACTIVE POLY(FLUOROALKYL-FUNCTIONAL SILOXANE) OLIGOMERS, PROCESS FOR FORMING THE SAME, AND COMPOSITIONS USING THE SAME

CROSS REFERENCE TO RELATED APPLICATIONS

The present application claims priority to and the benefit of U.S. Provisional Application 62/923,022 filed on Oct. 18, 2019 titled "Reactive Poly(Fluoroalkyl-Functional Siloxane) Oligomers, Process for Forming the Same, and Compositions Using the Same," the disclosure of which is incorporated herein by reference in its entirety.

FIELD OF INVENTION

The present invention relates to oligomers derived from a hydrolysable fluoroalkyl-functional silane, a composition comprising such oligomers, processes for making such compositions, and coatings formed from such compositions. In particular, the present invention relates to oligomers formed from partially hydrolyzing and condensing hydrolysable fluoroalkyl-functional silanes, compositions comprising such oligomers, processes for making such oligomers, and coatings formed from compositions of such oligomers.

BACKGROUND

In many applications or environments it may be desirable to impart hydrophobic and oleophobic properties to a surface to provide a water and oil repellant or water and oil resistant surface. The hydrophobic and oleophobic properties can be achieved by coating a surface with a coating or film having hydrophobic and oleophobic properties. Fluoroalkyl functional compounds, when deposited onto surfaces, impart low surface energy properties.

The deposition of fluoroalkyl-functional alkoxysilane or fluoroalkyl-functional chlorosilanes by spinning coating onto surfaces which have been roughened have been investigated by Z. Chu, etc. "Superamphiphobic surfaces" Chem. Soc. Rev. 2014, 43, 2784. However, to achieve the superamphiphobic properties, the surfaces have to be pre-roughened by functionalization with nanoparticles, etching including acid etching, base etching or electrochemical etching. The two step process is labor intensive and often requires employing costly ingredients and equipment.

Water repellant coatings containing linear fluoroalkyl-functional silanol oligomers having 1 to 7 repeat units for treating glass surfaces are described by Park, W, et al, in Korean Patent 887,573. The fluoroalkyl-functional silanol oligomers were prepared by hydrolyzing fluoroalkyl-functional silanes in excess of water and in a solvent to prepare a linear, low molecular weight hydroxyl-terminated and pendent siloxane dimers and oligomers. These components lack branching, and therefore are not facile in forming a crosslinked, three dimensional film on the surface of the glass.

Water soluble surface treating agents were also described by Kazuyuki Matsumura, et al., U.S. Pat. No. 5,739,369. These agents were terpolymers containing repeat units of fluorinated poly(oxyalkylene)-functional siloxy, amino-functional siloxy and alkyl-functional siloxy groups. The oxygen atoms in the fluorinated poly(oxyalkylene)-functional siloxy and the amino group of the amino-functional siloxy enable the agents to dissolve in water, but also make the materials less hydrophobic and less oleophobic because of the presence of these heteroatoms.

Water repellent coatings were described in Japanese Patent, 3598520 B2, in which a copolymer prepared from fluoroalkyl functional-silane and tetra-alkoxysilane in a weight ratio of from 0.1:99.9 to 10:90, dissolved in an organic solvent. The hydrolyzed tetra-alkoxysilane component provides for a silanol rich surface. Silanols are hydrophilic, increasing the surface energy of the coated surface and decreasing the coated surface hydrophobic and oleophobic properties.

Emulsions of 3,3,4,4,5,5,6,6,7,7,8,8,8-tridecafluorooctyl-triethoxysilane were disclosed by R. W. Avery in U.S. Pat. No. 6,300,379. These emulsion contain a surface wetting agent, a surfactant, which can decrease the hydrophobic properties of the treated surface and inhibit the silylation of the surface.

Fluorinated polyhedral oligomeric silsesquioxanes have been disclosed by T. S. Haddad in U.S. Pat. No. 9,790,377. These oligomeric silsesquioxanes have been spin coated onto inert surfaces to impart hydrophobic and oleophobic properties to the inert surface. These oligomeric silsesquioxanes do not contain reactive groups capable of forming covalent bonds with the surface. The lack of covalent bonding the hydrophobic and oleophobic agents to the surface may result in a loss of hydrophobic and oleophobic properties upon aging, especially in corrosive environments, including weathering in wet regions.

There is still a need to provide for agents, and coating comprising said agents, that can form durable films on reactive surfaces that exhibit improved hydrophobic and/or oleophobic properties and chemical resistance, even after exposure to corrosive environments.

SUMMARY OF INVENTION

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

In one aspect, provided is a reactive poly(fluoroalkyl-functional siloxane) oligomer. The oligomer comprises a reactive SiX groups, where each X is independently a hydroxy group or a hydrolyzable group.

In another aspect of the invention, provided is a poly (fluoroalkyl-functional siloxane) oligomer having the general formula (I):

$$T^1_a T^2_b T^3_c \qquad (I)$$

wherein
$T^1$ is independently $R^F$-Q-$SiX_2O_{1/2}$;
$T^2$ is independently $R^F$-Q-$SiXO_{2/2}$;
$T^3$ is independently $R^F$-Q-$SiO_{3/2}$;
each $R^F$ is independently $C_nF_{(2n+1)}$ group where n is from 1 to 16;
each Q is independently a divalent linear or branched alkylene group containing from 1 to 6 carbon atoms or a divalent linear or branched alkylene group containing from 1 to 6 carbon atoms and an oxygen atom to form an ether group or an oxo group and amino group to form an amido-alkylene group;
each X is independently a hydroxy group or a hydrolyzable group; and where a is an integer from 0 to 12, b is an integer from 1 to 10, and c is an integer from 1 to 10, with the provisos that
  (i) a half oxygen atom bonded to one silicon atom in a $T^1$, $T^2$, or $T^3$ unit is paired with a half oxygen atom bonded to a different silicon atom in a $T^1$, $T^2$, or $T^3$ unit to form a Si—O—Si bond; and
  (ii) the sum of a+b+c is from 5 to 32.

In one embodiment, each $R^F$ in T1, T2, and T3 is independently selected from groups consisting of $CF_3$—, $CF_3(CF_2)_2$—, $CF_3(CF_2)_3$—, $CF_3(CF_2)_4$—, $CF_3(CF_2)_5$—, $CF_3(CF_2)_6$— and $CF_3(CF_2)_7$—.

In one embodiment, each X in $T^1$, $T^2$, and $T^3$ is independently selected from a hydroxy group or an alkoxy group containing 1 to 6 carbon atoms.

In one embodiment, each Q in $T^1$, $T^2$, and $T^3$ is independently selected from —$(CH_2)_2$—, —$CH_2CH(CH_3)$—, —$(CH_2)_3$— or —$(CH_2)_4$—.

In one embodiment, the oligomer is a branched poly(fluoroalkyl-functional siloxane) oligomer of formula (I), wherein a is equal to 2+c, b is from 1 to 10, and c is from 1 to 10.

In one embodiment, the monocyclic poly(fluoroalkyl-functional siloxane) oligomer has the general formula (III):

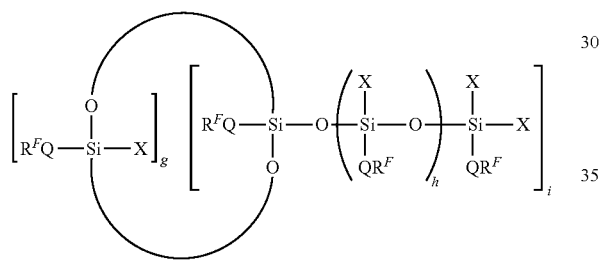

(III)

wherein
  each $R^F$ is independently a $C_nF_{(2n+1)}$ group where n is from 1 to 16;
  each Q is independently a divalent linear or branched alkylene group containing from 1 to 6 carbon atoms;
  each X is independently a hydroxy group or an alkoxy group containing 1 to 6 carbon atoms; and
  g is an integer from 1 to 5, each h is independently an integer from 0 to 5, and i is an integer from 1 to 5, with the provisos that the number of [Si($QR^F$)XO-] repeat units is from 1 to 10 and the sum of g+i is from 3 to 10.

In one embodiment, the oligomer is of the formula:

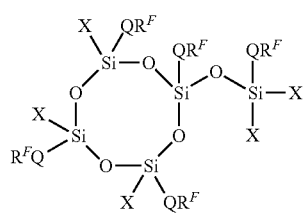

(III-a)

where each $QR^F$ is 1H,1H,2H,2H-perfluorooctyl and each X is methoxy;

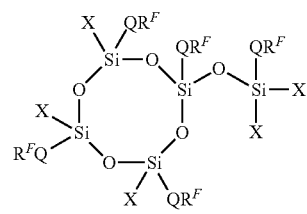

(III-b)

where each $QR^F$ is 1H,1H,2H,2H-perfluoropropyl and each X is ethoxy;

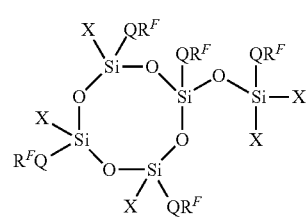

(III-c)

where each $QR^F$ is 1H,1H,2H,2H-perfluorohexyl and each X is ethoxy;

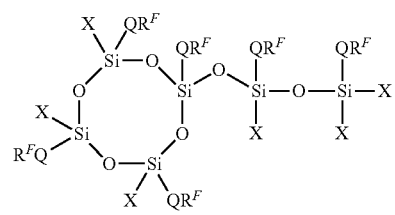

(III-d)

where each $QR^F$ is 1H,1H,2H,2H-perfluorooctyl and each X is methoxy; or

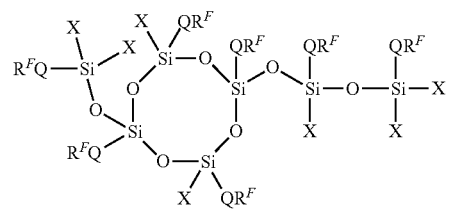

(III-e)

where each $QR^F$ is 1H,1H,2H,2H-perfluorooctyl and each X is methoxy.

In one embodiment, the oligomer is a polycyclic poly(fluoroalkyl-functional siloxane) oligomer having formula (I), wherein a is 0, b is from 1 to 10, and c is 2, 4, 6, 8, or 10.

In one embodiment, the oligomer has the general formula (IV):

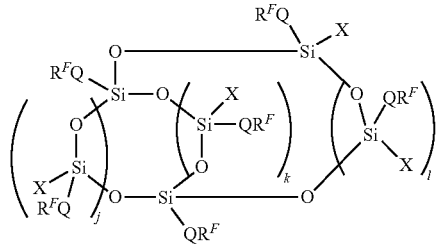
(IV)

wherein each $R^F$ is $C_nF_{(2n+1)}$ group where n is from 1 to 16;

Q is a divalent linear or branched alkylene group containing from 1 to 6 carbon atoms;

X is independently a hydroxy group or an alkoxy group containing 1 to 6 carbon atoms; and j is an integer from 1 to 5, k is an integer from 0 to 5, and l is an integer from 0 to 5, with the proviso that the sum of j+k+l is from 2 to 10.

In one embodiment, the oligomer is of the formula:

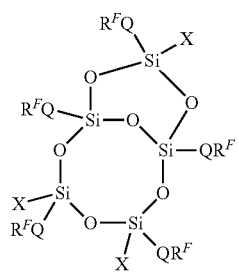
(IV-a)

where each $QR^F$ is 1H,1H,2H,2H-perfluorooctyl and each X is methoxy;

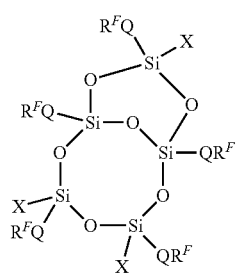
(IV-b)

where each $QR^F$ is 1H,1H,2H,2H-perfluoropropyl and each X is ethoxy;

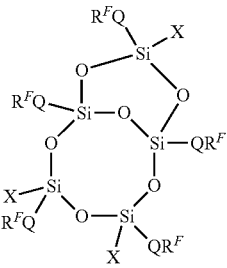
(IV-c)

where each $QR^F$ is 1H,1H,2H,2H-perfluorohexyl and each X is ethoxy;

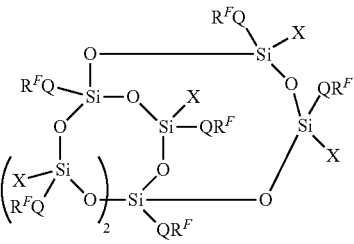
(IV-e)

where each $QR^F$ is 1H,1H,2H,2H-perfluorooctyl and X is methoxy;

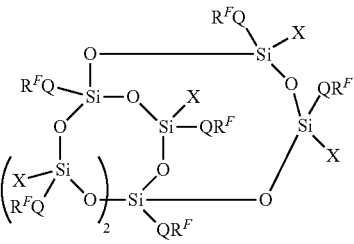
(IV-e)

where each $QR^F$ is 1H,1H,2H,2H-perfluorooctyl and each X is methoxy; or

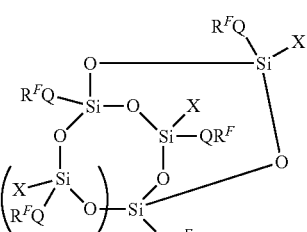
(IV-f)

where each $QR^F$ is 1H,1H,2H,2H-perfluorooctyl and each X is methoxy.

In still another aspect, provided is the reactive poly (fluoroalkyl-functional siloxane) oligomer of formula (I)

derived from a fluoroalkylsilane having the general formula (II).

$R^F$ is $C_nF_{(2n+1)}$ group where n is from 1 to 16;

Q is a divalent linear or branched alkylene group containing from 1 to 6 carbon atoms; and X is independently a hydroxy group or a hydrolyzable group. The reactive poly(fluoroalkyl-functional siloxane) oligomer is derived from the fluoroalkylsilane by partial or complete hydrolysis of the silane to form silanols and partial or complete condensation of these resulting silanol groups, provide that the oligomer contains at least one X group.

In yet another aspect, provided is a coating composition comprising reactive poly(fluoroalkyl-functional siloxane) oligomers. In yet still another aspect, provided is a coating formed from such coating compositions and/or an article comprising a coating formed from such coating compositions. Coatings or films formed from such compositions exhibit excellent hydrophobic and oleophobic properties and excellent chemical resistance. Chemical resistance is resistance to degradation from exposure to solvents, acids, and bases.

In one embodiment, the coating composition comprises the poly(fluoroalkyl-functional siloxane) oligomer of any of the previous aspects or embodiments and optionally at least one other coating additive.

In one aspect, provided is a substrate comprising the coating composition disposed on at least a portion of a surface thereof.

In one aspect, provided is a process for preparing the reactive poly(fluoroalkyl-functional siloxane) of any of the previous aspects or embodiments, wherein said process comprises reacting at least one fluoroalkyl-functional silane of formula (V):

wherein each $R^F$ is independently a $C_nF_{(2n+1)}$ group where n is from 1 to 16;

each Q is independently a divalent linear or branched alkylene group containing from 1 to 6 carbon atoms or a divalent linear or branched alkylene group containing from 1 to 6 carbon atoms and an oxygen atom to form an ether group or an oxo group and amino group to form an amidoalkylene group;

each X is independently a hydroxy group or a hydrolyzable group, with water, where the mole ratio of water to the silane of formula (V) is about 0.5:1 to 8:1, to provide for the reactive poly(fluoroalkyl-functional siloxane) oligomer having the general formula (I):

wherein $T^1$ is independently $R^F$-Q-SiX$_2$O$_{1/2}$;
$T^2$ is independently $R^F$-Q-SiXO$_{2/2}$;
$T^3$ is independently $R^F$-Q-SiO$_{3/2}$;
each $R^F$ is independently $C_nF_{(2n+1)}$ group where n is from 1 to 16;
each Q is independently a divalent linear or branched alkylene group containing from 1 to 6 carbon atoms;
each X is independently a hydroxy group or a hydrolyzable group; and
a, b and c are integers, where a is from 0 to 12, b is from 1 to 10 and c is from 1 to 10, with the provisos that (iii) the half oxygen atom bonded to one silicon atom is paired with a second half oxygen atom bonded to a different silicon atom to form a Si—O—Si bond; and (iv) the sum of a+b+c is from 5 to 32.

In one embodiment of the process, the molar ratio of water to the fluoroalkyl-functional silane of formula (V) is about 0.5:1 to 6:1.

In one embodiment of the process, the molar ratio of water to the fluoroalkyl-functional silane of formula (V) is about 0.75:1 to 2:1.

In one embodiment, the process further comprises a catalyst.

In one embodiment, the catalyst is selected from an acid, a base, a metal salt or a metal complex, an acid catalyst, an alkali catalyst, an organic amine catalyst, or a combination of two or more thereof.

In one embodiment, the catalyst is selected from hydrochloric acid, nitric acid, acetic acid, sulfuric acid, phosphoric acid, sulfonic acid, methanesulfonic acid, p-toluenesulfonic acid, sodium hydroxide, potassium hydroxide, ammonia, triethylamine, titanium isopropoxide, or dibutyltin dilaurate, and the catalyst is present in an amount of from about 10 to about 10,000 parts per million (ppm) based on the weight of the fluoroalkyl-functional silane of formula (V).

The following description discloses various illustrative aspects. Some improvements and novel aspects may be expressly identified, while others may be apparent from the description.

DETAILED DESCRIPTION OF THE INVENTION

Reference will now be made to exemplary embodiments, examples of which are illustrated in the accompanying tables. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used above, and throughout the description, the following terms, unless otherwise indicated, shall be understood to have the following meanings.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

As used herein, "alkyl" includes straight or branched alkyl groups; "alkenyl" includes any straight or branched alkenyl group containing one or more carbon-carbon double bonds where the point of substitution can be either at a carbon-carbon double bond or elsewhere in the group; and, "alkynyl" includes any straight or branched alkynyl group containing one or more carbon-carbon triple bonds and, optionally, one or more carbon-carbon double bonds where the point of substitution can be either at a carbon-carbon triple bond, a carbon-carbon double bond or elsewhere in the group.

Specific, non-limiting examples of alkyl groups include methyl, ethyl, propyl and isobutyl. Specific, non-limiting examples of alkenyls include vinyl, propenyl, allyl and methallyl. Specific, non-limiting examples of alkynyls include acetylenyl, propargyl and methylacetylenyl.

As used herein, "aryl" includes any aromatic hydrocarbon from which one hydrogen atom has been removed; "aralkyl" includes any of the aforementioned alkyl groups in which one or more hydrogen atoms have been substituted by the same number of like and/or different aryl (as defined herein) substituents; and "arenyl" includes any of the aforementioned aryl groups in which one or more hydrogen atoms have been substituted by the same number of like and/or different alkyl (as defined herein) substituents. Specific, non-limiting examples of aryl groups include phenyl and naphthalenyl. Specific, non-limiting examples of aralkyl groups include benzyl and phenethyl. Specific, non-limiting examples of arenyl groups include tolyl and xylyl.

As used herein, "alkylene" is a bivalent saturated aliphatic radical derived from an alkane by removal of two hydrogen atoms.

Other than in the working examples or where otherwise indicated, all numbers expressing amounts of materials, reaction conditions, time durations, quantified properties of materials, and so forth, stated in the specification and claims are to be understood as being modified in all instances by the term "about".

It will be understood that any numerical range recited herein includes all sub-ranges with that range and any combination of the various endpoints of such ranges or sub-ranges. It is also appreciated that numerical ranges, including the various endpoints described for a range or ranges, can be combined to form new and non-specified ranges It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

In one aspect, provided is a reactive poly(fluoroalkyl-functional siloxane) oligomer. The reactive feature is that the oligomer has reactive SiX groups, where each X is independently a hydroxy group or a hydrolyzable group. In another aspect of the invention, provided is the reactive poly(fluoroalkyl-functional siloxane) oligomer having the general formula (I):

$$T^1_a T^2_b T^3_c \quad (I)$$

wherein
$T^1$ is independently $R^F$-Q-SiX$_2$O$_{1/2}$;
$T^2$ is independently $R^F$-Q-SiXO$_{2/2}$;
$T^3$ is independently $R^F$-Q-SiO$_{3/2}$;
each $R^F$ is independently a $C_nF_{(2n+1)}$ group where n is from 1 to 16;
each Q is independently a divalent linear or branched alkylene group containing from 1 to 6 carbon atoms or a divalent linear or branched alkylene group containing from 1 to 6 carbon atoms and an oxygen atom to form an ether group or an oxo group and amino group to form an amidoalkylene group;
each X is independently a hydroxy group or a hydrolyzable group; and a, b and c are integers, where a is from 0 to 12, b is from 1 to 10 and c is from 1 to 10, with the provisos that
(i) a half oxygen atom bonded to one silicon atom in a $T^1$, $T^2$, or $T^3$ unit is paired with a half oxygen atom bonded to a different silicon atom in a $T^1$, $T^2$, or $T^3$ unit to form a Si—O—Si bond; and
(i) the sum of a+b+c is from 5 to 32.

$R^F$ may be a linear or branched fluoroalkyl group $C_nF_{(2n+1)}$ where n is from 1 to 16, more specifically from 2 to 12, even more specifically from 4 to 10, or yet more specifically from 6 to 8. Here as elsewhere in the specification and claims, numerical values can be combined to form non-specified ranges. In one embodiment, n is 1 to 6.

Particularly suitable groups for R include, but are not limited to, CF$_3$—, CF$_3$(CF$_2$)$_2$—, CF$_3$(CF$_2$)$_3$—, CF$_3$(CF$_2$)$_4$—, CF$_3$(CF$_2$)$_5$—, CF$_3$(CF$_2$)$_6$— or CF$_3$(CF$_2$)$_7$—. In one embodiment, $R^F$ is selected from CF$_3$(CF$_2$)$_4$—, CF$_3$(CF$_2$)$_5$—, CF$_3$(CF$_2$)$_6$— or CF$_3$(CF$_2$)$_7$—.

Q is a divalent alkylene group containing from 1 to 6 carbon atoms, more specifically from 1 to 3 carbon atoms and still specifically 3 carbon atoms. In one embodiment, Q is a divalent linear or branched alkylene group containing from 1 to 6 carbon atoms and an oxygen atom to form an ether group or an oxo group and amino group to form an amidoalkylene group. Particularly suitable groups for Q include, but are not limited to, a linear or branched alkylene group, an alkylene group having an amido group, or an alkylene group having an ether group. In embodiments, Q is a linear alkylene group. In one embodiment, Q is chosen from —(CH$_2$)$_2$—, —CH$_2$CH(CH$_3$)—, —(CH$_2$)$_3$— or —(CH$_2$)$_4$—.

X is a hydroxyl group or a hydrolyzable group. The hydrolyzable group can be chosen from an alkoxy group, an acyloxy group, a ketoxime group, an alkenyloxy group, an amino group, an aminooxy group, an amido group or a halogen atom. In one embodiment, X is chosen from a hydroxy group, an alkoxy group, or a chloro group. In another embodiment, X is chosen from a hydroxy group, a methoxy group, or an ethoxy group. It will be appreciated that where the compound contains multiple X groups, the X groups can be the same or different from one another.

In one aspect, the reactive poly(fluoroalkyl-functional siloxane) oligomer of formula (I) is a branched poly(fluoroalkyl-functional siloxane) oligomer in which the backbone has at least one pendent fluoroalkyl-functional siloxane group. In another aspect, a branched poly(fluoroalkyl-functional siloxane) oligomer can have formula (I), in which the subscripts are define as a is equal to 2+c, b is from 1 to 10 and c is from 1 to 10.

In one embodiment, the branched poly(fluoroalkyl-functional siloxane) oligomer has the general formula (II):

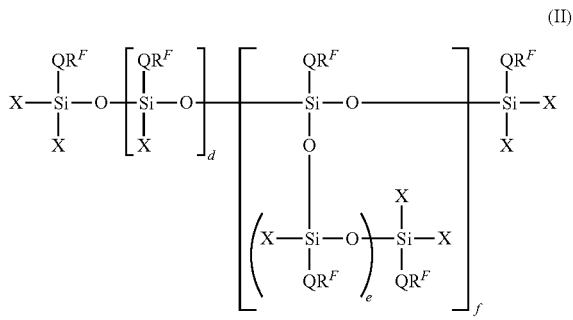

wherein each $R^F$, Q, and X are as defined above, and d, e, and f are integers, where d is independently from 1 to 10, e is independently from 0 to 2 and f is from 1 to 10, with the proviso that the number of [Si(QR$^F$)XO-] repeat units is from 1 to 10. It will be appreciated that d+(e·f) is equal to b in Formula (I).

In one embodiment, is $C_nF_{(2n+1)}$ group where n is from 1 to 16; Q is a divalent linear or branched alkylene group containing from 1 to 6 carbon atoms; X is independently a hydroxy group or an alkoxy group containing 1 to 6 carbon atoms.

In one embodiment, the [Si(QR$^F$)XO-] repeat units in formula (II) can be in any sequence including, for example, random, alternating, or blocked. Additionally, it will be appreciated that with respect to the proviso that the number of [Si(QR$^F$)XO-] repeat units is from 1 to 10 refers to the total number of such repeat units in the formula as represented by d+(e·f) units.

In one aspect, the branched poly(fluoroalkyl-functional siloxane) oligomer has the general formula (II) where X is hydroxyl, methoxy, or ethoxy, n is 4 to 6, Q is ethylene, d is from 1 to 5, e is from 0 to 2, and f is from 1 to 3, with the proviso that the number of [Si(QR$^F$)XO-] repeat units is from 1 to 10.

Representative and non-limiting examples of branched poly(fluoroalkyl-functional siloxane) oligomers include
$X_2Si(QR^F)O—[SiX(QR^F)O—][Si(QR^F)(OSi(QR^F)X_2)O—]Si(QR^F)X_2$, where QR$^F$ is 1H,1H,2H,2H-perfluorooctyl and X is methoxy;
$X_2Si(QR^F)O—[SiX(QR^F)O-]_2[Si(QR^F)(OSi(QR^F)X_2)O—]Si(QR^F)X_2$; where QR$^F$ is 1H,1H,2H,2H-perfluorooctyl and X is methoxy;
$X_2Si(QR^F)O—[SiX(QR^F)O—][Si(QR^F)(OSi(QR^F)X_2)O—][SiX(QR^F)O—]Si(QR^F)X_2$; where QR$^F$ is 1H,1H,2H, 2H-perfluorooctyl and X is methoxy;
$X_2Si(QR^F)O—[SiX(QR^F)O—][Si(QR^F)(OSi(QR^F)X_2)O—]Si(QR^F)X_2$, where QR$^F$ is 1H,1H,2H,2H-perfluoropropyl and X is ethoxy;
$X_2Si(QR^F)O—[SiX(QR^F)O—][Si(QR^F)(OSi(QR^F)X_2)O—]Si(QR^F)X_2$, where QR$^F$ is 1H,1H,2H,2H-perfluorohexyl and X is methoxy;
$X_2Si(QR^F)O—[SiX(QR^F)O—][Si(QR^F)(OSi(QR^F)X_2)O-]_2[SiX(QR^F)O—]Si(QR^F)X_2$; where QR$^F$ is 1H,1H,2H, 2H-perfluorooctyl and X is methoxy; or
$X_2Si(QR^F)O—[Si(QR^F)(OSi(QR^F)X_2)O—][SiX(QR^F)O—][Si(QR^F)(OSi(QR^F)X_2)O—][Si(QR^F)X_2$; where QR$^F$ is 1H,1H,2H,2H-perfluorooctyl and X is methoxy.

In one aspect, the reactive poly(fluoroalkyl-functional siloxane) oligomer of formula (I) is a monocyclic poly(fluoroalkyl-functional siloxane) oligomer in which the cyclic group has at least one pendent fluoroalkyl-functional siloxane group. In another aspect, the monocyclic poly(fluoroalkyl-functional siloxane) oligomer can have formula (I) in which the subscripts can be defined as a is from 1 to 10, b is from 1 to 10 and c is equal to a.

In one embodiment, the monocyclic poly(fluoroalkyl-functional siloxane) oligomer has the general formula (III):

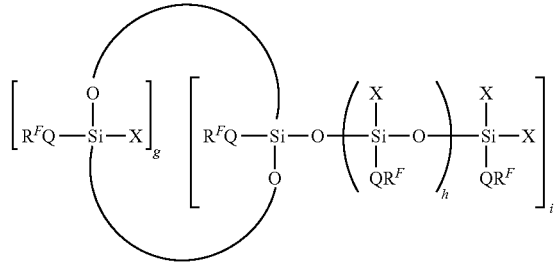

wherein $R^F$, Q, and X are as described above, and g, h and i are integers, where g is independently from 1 to 5, h is independently from 0 to 5 and i is from 1 to 5, with the provisos that the number of [Si(QR$^F$)XO-] repeat units is from 1 to 10 and the sum of g+i is from 3 to 10.

In one embodiment, each R is $C_nF_{(2n+1)}$ group where n is from 1 to 16; Q is a divalent linear or branched alkylene group containing from 1 to 6 carbon atoms; and X is independently a hydroxy group or an alkoxy group containing 1 to 6 carbon atoms.

The [Si(QR$^F$)XO-] repeat units in the ring of formula (III) can be in any sequence including random, alternating, or blocked. Additionally, it will be appreciated that with respect to the proviso that the number of [Si(QR$^F$)XO-] repeat units is from 1 to 10 refers to the total number of such repeat units in the formula as represented by g+(h*i) units.

In one aspect, the monocyclic poly(fluoroalkyl-functional siloxane) oligomer has the general formula (III), where X is hydroxyl, methoxy or ethoxy, n is 4 to 6, Q is ethylene and g is from 1 to 3, h is from 0 to 2 and i is from 1 to 3, with the proviso that the number of [Si(QR$^F$)XO-] repeat units is from 1 to 10.

Representative and non-limiting examples of monocyclic poly(fluoroalkyl-functional siloxane) oligomers include

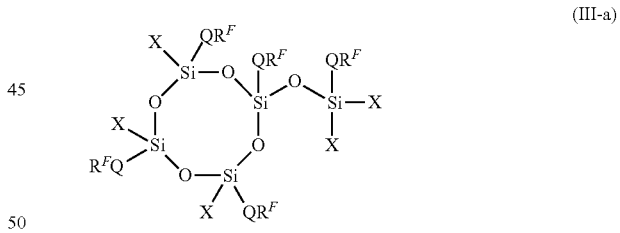

where each QR$^F$ is 1H,1H,2H,2H-perfluorooctyl and each X is methoxy;

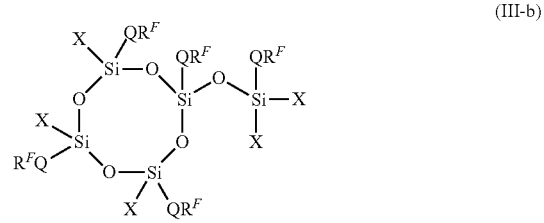

where each QR$^F$ is 1H,1H,2H,2H-perfluoropropyl and each X is ethoxy;

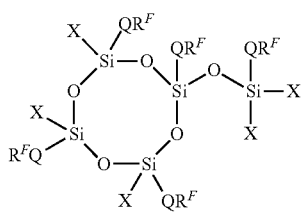
(III-c)

where each QR$^F$ is 1H,1H,2H,2H-perfluorohexyl and each X is ethoxy;

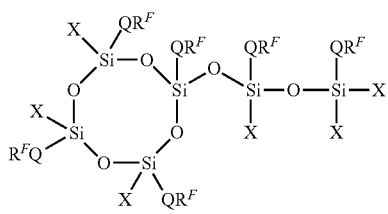
(III-d)

where each QR$^F$ is 1H,1H,2H,2H-perfluorooctyl and each X is methoxy; or

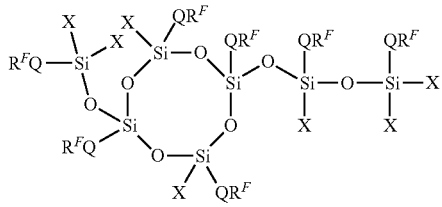
(III-e)

where each QR$^F$ is 1H,1H,2H,2H-perfluorooctyl and each X is methoxy.

While the various groups of the compounds of formulas (III-a)-(III-e) are describe as particular groups, it will be appreciated that the foregoing formulas encompass embodiments where QR$^F$ and X can be independently selected from the various groups defined above with respect to Formulas (I) and (III).

In one aspect, the reactive poly(fluoroalkyl-functional siloxane) oligomer of formula (I) is a polycyclic poly (fluoroalkyl-functional siloxane) oligomer in which the polycyclic does not contain any pendent fluoroalkyl-functional siloxane groups. In one embodiment, the polycyclic poly(fluoroalkyl-functional siloxane) oligomer can be formula (I) in which the subscripts can be defined as a is 0, b is from 1 to 10, c is 2, 4, 6, 8 or 10.

In one embodiment, the polycyclic poly(fluoroalkyl-functional siloxane) oligomer has the general formula (IV):

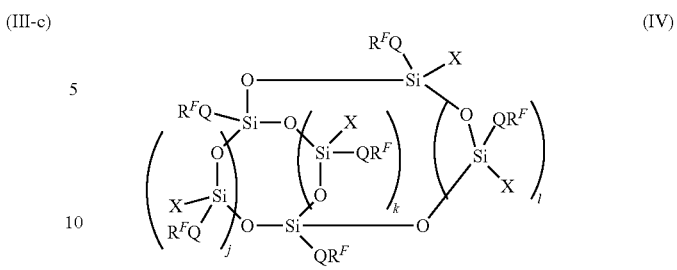
(IV)

wherein R$^F$, Q, and X are as defined above, and j, k and l are integers, where j is from 1 to 5, k is independently from 0 to 5 and i is from 0 to 5, with the proviso that the sum of j+k+l is from 2 to 10, more specifically from 4 to 10.

In one embodiment, each R$^F$ is C$_n$F$_{(2n+1)}$ group where n is from 1 to 16; Q is a divalent linear or branched alkylene group containing from 1 to 6 carbon atoms; and X is independently a hydroxy group or an alkoxy group containing 1 to 6 carbon atoms.

In one aspect, the polycyclic poly(fluoroalkyl-functional siloxane) oligomer has the general formula (IV), where X is hydroxyl, methoxy, or ethoxy, n is 4 to 6, Q is ethylene, j is from 1 to 3, k is from 0 to 3, and l is from 0 to 3.

Non-limiting examples of the polycyclic poly(fluoroalkyl-functional siloxane) oligomers (IV) include

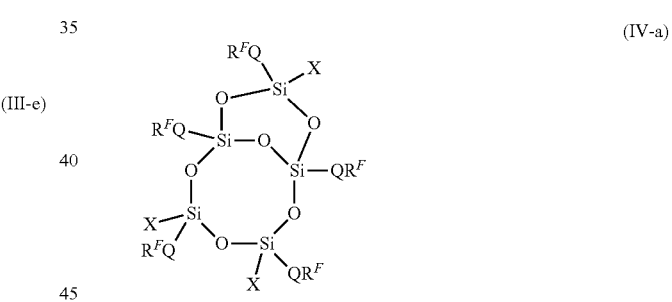
(IV-a)

where each QR$^F$ is 1H,1H,2H,2H-perfluorooctyl and each X is methoxy;

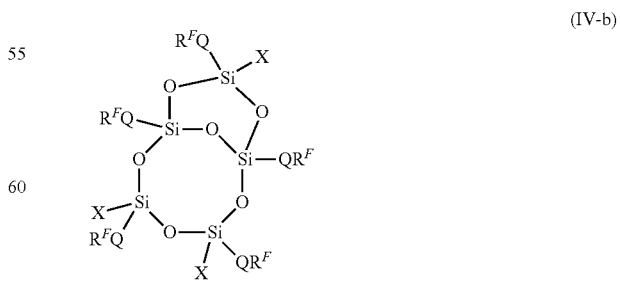
(IV-b)

where each QR$^F$ 1H,1H,2H,2H-perfluoropropyl and each X is ethoxy;

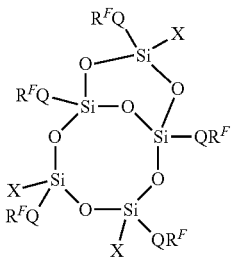

(IV-c)

where each QR$^F$ 1H,1H,2H,2H-perfluorohexyl and each X is ethoxy;

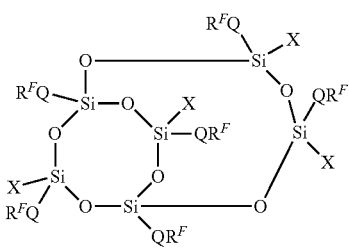

(IV-d)

where each QR$^F$ 1H,1H,2H,2H-perfluorooctyl and each X is methoxy;

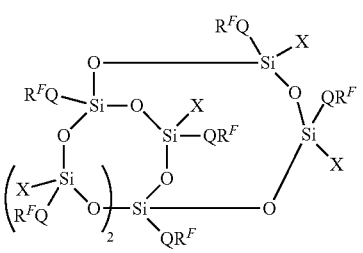

(IV-e)

where each QR$^F$ 1H,1H,2H,2H-perfluorooctyl and each X is methoxy; or

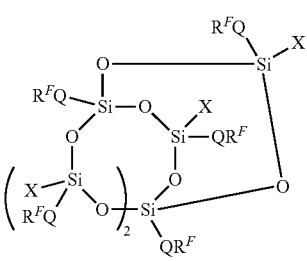

(IV-f)

where each QR$^F$ 1H,1H,2H,2H-perfluorooctyl and each X is methoxy.

While the various groups of the compounds of formulas (IV-a)-(IV-f) are describe as particular groups, it will be appreciated that the foregoing formulas encompass embodiments where QR$^F$ and X can be independently selected from the various groups defined above with respect to Formulas (I) and (IV).

The poly(fluoroalkyl-functional siloxane) oligomer is a material that is a partially or completely hydrolyzed and partially or completely condensate of the fluoroalkyl silane of formula (V):

$$R^FQ\text{-}SiX_3 \qquad (V)$$

wherein

R$^F$ is a $C_nF_{(2n+1)}$ group where n is from 1 to 16;

Q is a divalent linear or branched alkylene group containing from 1 to 6 carbon atoms or a divalent linear or branched alkylene group containing from 1 to 6 carbon atoms and an oxygen atom to form an ether group or an oxo group and amino group to form an amidoalkylene group;

each X is independently a hydroxy group or a hydrolyzable group.

R$^F$ may be a linear or branched fluoroalkyl group $C_nF_{(2n+1)}$ where n is from 1 to 16, more specifically from 2 to 12, even more specifically from 4 to 10, or yet more specifically from 6 to 8. Here as elsewhere in the specification and claims, numerical values can be combined to form non-specified ranges. In an embodiment, n is 1 to 6.

Particularly suitable groups for R$^F$ include, but are not limited to, $CF_3$—, $CF_3(CF_2)_2$—, $CF_3(CF_2)_3$—, $CF_3(CF_2)_4$—, $CF_3(CF_2)_5$—, $CF_3(CF_2)_6$—, or $CF_3(CF_2)_7$—. In one embodiment, R$^F$ is selected from $CF_3(CF_2)_4$—, $CF_3(CF_2)_5$—, $CF_3(CF_2)_6$—, or $CF_3(CF_2)_7$—.

Q is a divalent alkyl group containing from 1 to 6 carbon atoms, more specifically from 1 to 3 carbon atoms and still specifically 3 carbon atoms. In one embodiment, Q is a divalent linear or branched alkylene group containing from 1 to 6 carbon atoms and an oxygen atom to form an ether group or an oxo group and amino group to form an amidoalkylene group. Particularly suitable groups for Q include, but are not limited to, a linear or branched alkylene group, an alkylene group having an amido group, or an alkylene group having an ether group. In embodiments, Q is a linear alkylene group. In one embodiment, Q is chosen from —$(CH_2)_2$—, —$CH_2CH(CH_3)$—, —$(CH_2)_3$— or —$(CH_2)_4$—.

X is a hydroxyl group or a hydrolyzable group. The hydrolyzable group can be chosen from an alkoxy group, an acyloxy group, a ketoxime group, an alkenyloxy group, an amino group, an aminooxy group, an amido group or a halogen atom. In one embodiment, X is chosen from a hydroxy group, an alkoxy group, or a chloro group. In another embodiment, X is chosen from a hydroxy group, a methoxy group, or an ethoxy group. It will be appreciated that where the compound contains multiple X groups, the X groups can be the same or different from one another.

The extent of the oligomerization of the poly(fluoroalkyl-functional siloxane) oligomer, which results from the condensation reactions of the silanol can be measured by $^{29}$Si-NMR spectroscopy. The $^{29}$Si nuclear magnetic resonance ($^{29}$Si-NMR) can be carried out on a Bruker Advance 600 Spectrometer operating at field strength of 14.1 T; $^1$H's resonate at 600 MHz. The sample is dissolved in a Novec HFE 7100 solvent and placed in a 10 mm NMR tube with a relaxation agent, 0.05M Cr(AcAc)$_3$. Inverse gated decoupling pulse sequence is used with a pulse width of 45-degrees ($^{29}$Si: D1 of 25 seconds, AQ of 1.41 seconds). The spectrum is integrated. The integrals for the different species are measured at 44 to 46 ppm for the T° species, 50 to 54 ppm for the T$^1$ species, 57 to 62 for the T$^2$ species, and 63 to 72 ppm for the T$^3$ species.

The oligomer can have a weight average molecular weight (Mw) of from about 1000 to about 14500, more specifically from about 1500 to about 8000, even more specifically from about 2000 to about 5000 and still yet more specifically from about 2500 about 3000. The weight average molecular weight can be determined in accordance with ASTM D4001-93 (2006) Standard Test Method for Determination of Weight-Average Molecular Weight of Polymers by Light Scattering.

The poly(fluoroalkyl-functional siloxane) oligomers are formed by hydrolysis of compounds of the formula (V). The oligomers can be formed by the hydrolysis of compounds of formula (V) that are the same or different from one another. The hydrolysis reaction of formula (V) with water can be carried out in the presence or absence of a catalyst. Suitable catalysts include, but are not limited to an acid catalyst, an alkali catalyst, an organic amine catalyst, or a metal catalyst. The metal catalyst can be a metal salt or a metal complex. In one embodiment, the catalyst is chosen from hydrochloric acid, nitric acid, acetic acid, sulfuric acid, phosphoric acid, sulfonic acid, methanesulfonic acid, p-toluenesulfonic acid, sodium hydroxide, potassium hydroxide, ammonia, triethylamine, titanium isopropoxide, or dibutyltin dilaurate. It will be appreciated that the water may be provided as part of an aqueous catalyst composition.

The catalyst can be used at amounts of from 10 to 10,000 parts per million (ppm), from 15 to 5,000 part per million (ppm), or from 20 to 2,500 parts per million (ppm), based on the weight of the fluoroalkylsilane of formula (V).

The extent of the oligomerization poly(fluoroalkyl-functional siloxane) oligomer as can be characterized by the integration of the peaks in the $^{29}$Si-NMR spectrum and/or the size of the oligomer, which is based on its weight average molecular weight, is controlled by controlling the amount of water in the reaction system, by selecting suitable catalyst, and/or by choosing appropriate reaction condition. In particular, the molar ratio of the water to the fluoroalkyl silane of formula (V) is controlled to provide the present oligomers. In one embodiment, the molar ratio of water to fluoroalkyl silane of formula (V) (water:silane) is about 0.5:1 to about 8:1, more specifically from about 0.5:1 to about 6:1, from about 0.5:1 to about 2.5:1, from about 0.75:1 to about 2:1, from about 1:1 to about 1.5:1, or from about 1:1 to about 1.25:1. Here as elsewhere in the specification and claims, numerical values can be combined to form new and non-specified ranges.

As part of the process for preparation, the fluoroalkyl silane of formula (V) can be dissolved in a solvent. Any solvent suitable for dissolving a fluoroalkyl silane of formula (V) may be used, such as, but not limited to, acetone, HFE7100, methanol, ethanol, isopropanol, trifluoroethanol, and toluene. In one embodiment, the solvent is acetone. The solvent can be used to improve the solubility of the water in the reaction mixture, forming a reaction solution.

The films formed from the coating composition comprising reactive poly(fluoroalkyl-functional siloxane) oligomer may exhibit hydrophobic properties so as to provide a water resistant or water repellant property to a surface and/or oleophobic properties, to provide for oil resistance properties. Additionally, the films formed from these composition may exhibit excellent chemical resistance. Chemical resistance may be evidenced by the resistance of the coating to degrade or deteriorate upon exposure to a chemical species (e.g., a solvent). This can also be evidenced by the coatings ability to retain or substantially retain its hydrophobic and/or oleophobic properties after exposure to a chemical species.

A coating composition comprises one poly(fluoroalkyl-functional siloxane) oligomer of formula (I) or two or more different poly(fluoroalkyl-functional siloxane) oligomer of formula (I) and optionally other components such as, for example, solvents, catalysts to promote the curing of the coating, and other components typically used in preparing coating compositions.

Any organic solvent may be used. The organic solvent is selected from any solvent suitable for dissolving the oligomer. Suitable solvents include, but are not limited to, an alcohol, an ether, a ketone, an aromatic hydrocarbon, a paraffin type hydrocarbon, or an ester. Particularly suitable solvents are fluoro-containing compounds such as, but not limited to, a fluoro-alcohol, a fluoro-hydrocarbon, an alkoxy-fluoroalkyl, or a fluoro-ether. In one embodiment, the solvent is selected from a fluoro ether or Examples of suitable solvents include, but are not limited to, perfluorohexane, perfluoromethyl cyclohexane, $CF_3CH_2OCF_2CHF_2$, $CH_3OC_4F_9$, or the like.

The amount of organic solvent can range from 1 weight percent to 99.9 weight percent, based on the sum to the weights of the poly(fluoroalkyl-functional siloxane) oligomer(s) of formula (I) and the solvent. The curing catalyst may be acids, bases, metal salts or metal complexes. For example, acids include inorganic or organic acids, such as carboxylic acids, organic sulfonic acids, hydrogen chloride, sulfuric acid, phosphoric acid, and the like. Bases may include alkali or alkaline metal salts of hydroxide or alkoxides, such as methoxide, ethoxide or tert-butoxide, ammonium, amines, amidines, and the like. Metal salts and metal complexes may include alkoxides or carboxylates of titanium, zirconium bismuth, aluminum, iron and the like or chelated metals of titanium, zirconium bismuth, aluminum, iron and the like, where the chelating compound are ketones, such as acetylacetone, acetylacetic acid, and the like, and amines. The amounts of curing catalyst can be from 10 parts per million to 5 weight percent, based on the weight of the poly(fluoroalkyl-functional siloxane) oligomer, more specifically 100 parts per million to 2 weight percent, based on the weight of the poly(fluoroalkyl-functional siloxane) oligomer, and even more specifically from 1000 parts per million to 1 weight percent, based on the weight of the poly(fluoroalkyl-functional siloxane) oligomer.

In one embodiment, the coating composition consists essentially of poly(fluoroalkyl-functional siloxane) oligomer(s) of formula (I). In another embodiment, the coating composition consists essentially of poly(fluoroalkyl-functional siloxane) oligomer(s) of formula (I), a solvent and a curing catalysts. In an aspect, the coating composition, which comprises the poly(fluoroalkyl-functional siloxane) oligomer(s) of formula (I), is free of the fluoroalkyl silane of formula (V).

Applicant has found that poly(fluoroalkyl-functional siloxane) oligomer(s) of formula (I) alone can provide a suitable hydrophobic and/or oleophobic coating.

The composition of the present invention may contain a functional additive. Suitable functional additives may include, but are not limited to, fine particles of a metal oxide such as silica, alumina, zirconia, titania, etc., a dye, a pigment, an antifouling material, a curing catalyst, or various resins. In embodiments, the amount of the functional additive to be added, is at most 20 parts by mass, at most 10 parts by mass, for example from 1 to 10 parts by mass, per 100 parts by mass of the solid content of the composition (components excluding volatile content such as an organic solvent).

A film of the coating composition may be formed by any suitable method. The coating composition can be applied to a surface of a substrate by any suitable method including, but not limited to, brush coating, flow coating, spin-coating, dip coating, squeegee coating, spray coating or manual coating. The coating composition can then be dried as the case requires in the atmospheric air or nitrogen atmosphere, followed by curing to form the cured coating or film. The conditions for curing may suitably be selected, and for examples, conditions at a temperature of from 20 to 120° C. under a relative humidity of from 50 to 95% may be mentioned.

The thickness of the film is not particularly limited. In embodiments, the film formed from the present coating compositions has a thickness up to about 50 nm. In one embodiment, the film has a thickness of from about 1 to about 50 nm, about 2 to about 30 nm, about 5 to about 25 nm, or about 10 to about 15 nm. In one embodiment, the coating may have a thickness from about 2 to about 20 nm.

The substrate coated with the present compositions is not particularly limited. Examples of suitable substrates include, but are not limited to, a metal, plastic, glass, ceramics or a combination thereof (such as a composite material or a laminated material). The glass may, for example, be soda lime glass, borosilicate glass, alkali-free glass or quartz glass.

The shape of the substrate is not particularly limited and may be a plate shape or a shape having a curvature over its entire surface or a part thereof. The thickness of the substrate may suitably be selected depending upon the particular application. In embodiments, the substrate can have a thickness of from 1 to 10 mm.

The coating is formed on at least a part on the substrate. The region on the substrate surface at which the coating is to be formed is not particularly limited and may be selected depending upon the particular application. In a case where the substrate is a plate shape, the coating is usually formed over the entire surface on one side or both sides of the substrate.

The substrate coated with the film formed from the coating composition may form a part of or the entirety of an article. The article may be a window, a lens, a sensor, etc. The articles can be used in a variety of applications including transportation such as on ships, cars, planes, trains, components thereof, etc., windows, mirrors, bumpers, optical articles such as lenses, and the like.

Further, the film of the coating compositions may exhibit excellent chemical resistance in that the hydrophobic and/or oleophobic properties after exposure to different chemical environments, such as HFE7100, acetone, toluene, methylethylketone (MEK), methanol, 0.1 N aqueous HCl solution, 0.1 N aqueous KOH solution, and so forth. It will be appreciated that the coating compositions may include a mixture of poly(fluoroalkyl-functional siloxane) oligomer of formula (I). For example, the coating compositions may include a first oligomer of a first weight average molecular weight and a second oligomer of a second weight average molecular weight.

The invention may be better understood by reference to the following examples in which the parts and percentages are by weight unless otherwise indicated.

EXAMPLES

Example 1:
Poly(1H,1H,2H,2H-perfluorooctyl-functional Siloxane) Oligomer A 1H,1H,2H,2H-perfluorooctyltrimethoxysilane (50.0 grams, 106.7 mmol) was dissolved in acetone (100 grams). A 0.05 N HCl aq. solution (1.443 grams) (molar ratio of silane/water of about 1/0.75) was added to the acetone solution with agitation at room temperature. The reaction mixture was monitored by GC. The volatiles were removed by stripping at 50° C. under 50 mm Hg with $N_2$ sparging. The residual colorless to off-white oil was polish-filtered. The product is insoluble in common organic solvents but soluble in fluorinated ones. The $^{29}$Si NMR characterization was 0.67 mol percent $T^0$, 9.60 mol percent $T^1$, 26.73 mol percent $T^2$ and 63.00 mol percent $T^3$.

Example 2:
Poly(1H,1H,2H,2H-perfluorooctyl-functional Siloxane) Oligomer B 1H,1H,2H,2H-perfluorooctyltrimethoxysilane (10.0 grams, 21 mmol) was placed in a 3-neck round bottom flask equipped with a thermometer, condenser, and stopcock. Deionized water (0.2899 grams, 16 mmol) (molar ratio of silane/water is about 1/0.75) was charged with agitation at room temperature. Para-toluenesulfonic acid monohydrate (0.0406 grams, 1 mol % relative to silane) was added with agitation at room temperature. The reaction was monitored by GC. The volatiles were removed by stripping at room temperature under 10 mmHg. The material was washed with methanol three times and stripped under the same conditions. The product is insoluble in common organic solvents, but is soluble in fluorinated ones. The $^{29}$Si NMR characterization was 0.22 mol percent $T^0$, 29.90 mol percent $T^1$, 56.35 mol percent $T^2$ and 13.53 mol percent $T^3$.

Example 3:
Poly(1H,1H,2H,2H-perfluorooctyl-functional Siloxane) Oligomer C 1H,1H,2H,2H-perfluorooctyltrimethoxysilane (23.42 grams, 50 mmol) was dissolved in acetone (46.8 grams). A 0.05 N HCl aq. solution (901 mg) (molar ratio of silane/water of about 1/1) was added to the acetone solution with agitation at room temperature. The reaction mixture was monitored by GC. The volatiles were removed by stripping at 50° C. under 50 mm Hg with $N_2$ sparging. The residual colorless to off-white oil was polish-filtered. The product is insoluble in common organic solvents but soluble in fluorinated ones. The $^{29}$Si NMR characterization was 0.00 mol percent $T^0$, 1.46 mol percent $T^1$, 11.43 mol percent $T^2$ and 87.11 mol percent $T^3$.

Example 4:
Poly(1H,1H,2H,2H-perfluorooctyl-functional Siloxane) Oligomer D 1H,1H,2H,2H-perfluorooctyltrimethoxysilane (10.0 grams, 21.4 mmol) was dissolved in acetone (20.0 grams). A 0.05 N HCl aq. solution (385 mg, contains 21.4 mmol water) and DI water (385 mg, 21.4 mmol) was added to the acetone solution with agitation at room temperature (molar ratio of silane/total water of about 1/2). The reaction mixture was monitored by GC. The volatiles were removed by stripping at 50° C. under 50 mm Hg with $N_2$ sparging. The residual colorless to off-white oil was polish-filtered. The product is insoluble in common organic solvents but soluble in fluorinated ones. The $^{29}$Si NMR characterization was 0.00 mol percent $T^0$, 0.00 mol percent $T^1$, 54.01 mol percent $T^2$ and 45.99 mol percent $T^3$.

Example 5:
Poly(1H,1H,2H,2H-perfluorooctyl-functional Siloxane) Oligomer E 1H,1H,2H,2H-perfluorooctyltrimethoxysilane (10.0 grams, 21 mmol) was dissolved in acetone (20.0 grams) in a 3-neck round bottom flask equipped with a thermometer, condenser, and stopcock. A 0.05 N HCl aq. solution (0.3848 grams, 21 mmol water) was diluted with deionized water (0.5772 grams, 32 mmol) (molar ratio of silane/water of about 1/2.5) and then was added to the acetone solution with agitation at room temperature. The reaction mixture was monitored by GC. The volatiles were removed by stripping at room temperature under 10 mmHg. The product is insoluble in common organic solvents, but soluble in fluorinated ones. The $^{29}$Si NMR characterization was 0.00 mol percent $T^0$, 0.00 mol percent $T^1$, 60.39 mol percent $T^2$ and 39.61 mol percent $T^3$.

Example 6:
Poly(1H,1H,2H,2H-perfluorooctyl-functional Siloxane) Oligomer F

A solution of methanol (20 mL), deionized water (0.2309 grams, 12.8 mmol), and potassium hydroxide (1.0 milligrams, 0.000018 mmol) was added to a 3-neck round bottom flask equipped with a thermometer, condenser, and stopcock. 1H,1H,2H,2H-perfluorooctyltrimethoxysilane (1.0 grams, 2.1 mmol) (molar ratio of silane/water of about 1/6) was added to the methanol solution with agitation at room temperature. The reaction mixture was monitored by GC. The volatiles were removed by stripping at room temperature under 10 mmHg. The material was washed with methanol, and then stripped under the same conditions. The product is insoluble in common organic solvents, but is soluble in fluorinated ones. The $^{29}$Si NMR characterization was 0.16 mol percent $T^0$, 18.98 mol percent $T^1$, 42.33 mol percent $T^2$ and 38.54 mol percent $T^3$.

Examples 7 to 12 and Comparative Examples A and B

Performance Testing

Coating compositions were prepared from the poly(1H, 1H,2H,2H-perfluorooctyl-functional siloxane) oligomers A to F and their hydrophobicity and oleophobicity was evaluated by measuring the water and HDC (hexadecane) contact angles of the coatings after they were exposed to different chemical environments. The coatings were evaluated using the following procedure: Microscope glass slides were cleaned twice with isopropanol and dried with $N_2$. The slides were placed in a 100 mL plastic beaker and were leaned on the wall of the beaker. The angle between the slide and beaker bottom was around 50 degrees. Poly(1H,1H,2H,2H-perfluorooctyl-functional siloxane) oligomer solutions (10 wt. %) were prepared for each oligomer A to F by dissolving 0.10 gram sample of the selected oligomer in 0.90 gram of HFE 7100. For each oligomer solution, about 0.50 gram of the poly(1H,1H,2H,2H-perfluorooctyl-functional siloxane) oligomer solution was pipetted onto the top of the slide until the solution flowed to the bottom. The flow-coated slides were dried in the air for about 5 minutes at room temperature (about 20-25° C.). The slides were then moved to an aluminum weighing pan and they were placed in an oven and aged for 1 hour at 105° C. After the 1-hour ageing, the initial contact angles were measured and the slides were then submerged completely in HFE 7100, acetone, MEK, toluene, methanol, 0.1 N aqueous HCl solution, or 0.1 N aqueous KOH solution for 60 minutes, washed with HFE7100, and dried in the air for 10 min. The final water and HDC contact angles were measured by taking the average of 5 parallel results. The results of the measurements are shown in Tables 1 and 2.

Comparative Example A is a "control" slide that is coated only with the solvent (HFE7100).

Comparative Example B is a slide that is coated with a composition comprising a 1H,1H,2H,2H-perfluorooctyltrimethoxysilane monomer.

Tables 1 and 2 present the water and HDC contact angles, respectively, of the coated panels before (initial) and after they were exposed to HFE7100, 0.1 N aqueous HCl solution, or 0.1 N aqueous KOH solution for 60 minutes.

TABLE 1

Water contact angle measurements before (initial) and after exposure to corrosive chemicals for varying periods of time.

| | Example number | | | | | | | |
|---|---|---|---|---|---|---|---|---|
| | Comp. A | Comp. B | Ex. 7 | Ex. 8 | Ex. 9 | Ex. 10 | Ex. 11 | Ex. 12 |
| | Compound used to prepare coating composition | | | | | | | |
| | None | Silane | A | B | C | D | E | F |
| | Contact angle, ° | | | | | | | |
| initial water contact angle | 54.8 | 100.7 | 123.6 | 116.7 | 132.8 | 130.4 | 132.0 | 130.2 |
| HFE7100 10 min | 49.0 | 109.8 | 112.9 | 110.6 | 118.1 | 119.4 | 120.1 | 42.6 |
| HFE7100 30 min | 62.3 | 108.3 | 115.2 | 115.1 | 124.7 | 124.5 | 125.4 | 52.5 |
| HFE7100 60 min | 43.0 | 107.6 | 115.1 | 112.9 | 119.7 | 119.1 | 119.3 | 86.9 |
| HFE7100 120 min | 47.6 | 102.3 | 117.6 | 108.8 | 117.4 | 116.5 | 118.4 | 56.5 |
| Acetone 60 min | 47.6 | 108.9 | 130.5 | 129.5 | 126.4 | 130.9 | 122.7 | 112.6 |
| Toluene 60 min | 44.2 | 104.7 | 131.4 | 115.8 | 134.2 | 133.7 | 133.9 | 135.9 |
| MEK 60 min | 66.2 | 108.4 | 127.8 | 129.5 | 130.8 | 141.5 | 143.0 | 102.2 |
| MeOH 60 min | 49.3 | 109.8 | 128.6 | 129.4 | 132.8 | 142.2 | 131.5 | 134.3 |
| 0.1N aq. HCl 60 min | 37.2 | 109.4 | 135.5 | 125.6 | 132.3 | 133.3 | 133.1 | 133.0 |
| 0.1N aq. KOH 60 min | 40.5 | 73.8 | 132.1 | 131.2 | 132.4 | 132.9 | 132.8 | 133.4 |

TABLE 2

Hexadecane contact angle measurements before (initial) and after exposure to corrosive chemicals for varying periods of time.

| | Example number | | | | | | | |
|---|---|---|---|---|---|---|---|---|
| | Comp. A | Comp. B | Ex. 7 | Ex. 8 | Ex. 9 | Ex. 10 | Ex. 11 | Ex. 12 |
| | Compound used to prepare coating composition | | | | | | | |
| | None | Silane | A | B | C | D | E | F |
| | Contact angle, ° | | | | | | | |
| initial hexadecane contact angle | 11.9 | 69.5 | 72.7 | 65.4 | 80.5 | 79.4 | 78.0 | 109.2 |
| HFE7100 10 min | 17.1 | 66.7 | 76.6 | 79.2 | 80.4 | 79.5 | 82.1 | 79.6 |
| HFE7100 30 min | 18.5 | 63.9 | 77.1 | 79.9 | 87.3 | 80.2 | 82.2 | 79.2 |
| HFE7100 60 min | 17.7 | 61.7 | 82.8 | 80.8 | 83.5 | 80.0 | 80.7 | 83.0 |
| HFE7100 120 min | 31.1 | 67.2 | 82.3 | 76.5 | 81.6 | 79.9 | 76.7 | 82.8 |
| Acetone 60 min | 12.8 | 71.3 | 83.8 | 81.3 | 79.6 | 87.2 | 88.4 | 77.4 |
| Toluene 60 min | 12.0 | 68.7 | 80.6 | 74.6 | 82.0 | 88.1 | 85.0 | 82.7 |
| MEK 60 min | 24.9 | 66.3 | 83.9 | 85.1 | 83.7 | 78.9 | 79.2 | 77.0 |
| MeOH 60 min | 28.5 | 62.9 | 81.3 | 85.3 | 109.4 | 80.1 | 80.9 | 83.8 |
| 0.1N aq. HCl 60 min | 9.5 | 65.5 | 82.3 | 81.1 | 82.9 | 91.9 | 87.7 | 85.7 |
| 0.1N aq. KOH 60 min | 12.8 | 37.8 | 80.1 | 80.7 | 81.4 | 93.5 | 86.8 | 83.7 |

As illustrated in Table 1, the coating compositions comprising the poly(1H,1H,2H,2H-perfluorooctyl-functional siloxane) oligomers A to F provided for a more hydrophobic surface than the no silane control, or the 1H,1H,2H,2H-perfluorooctyltrimethoxysilane containing coating composition, and as indicated by the higher water contact angles, before exposure to corrosive chemicals. The coating compositions comprising the poly(1H,1H,2H,2H-perfluorooctyl-functional siloxane) oligomers A to E are also more chemical resistant towards HFE7100, acid, and base than the no silane control, or the 1H,1H,2H,2H-perfluorooctyltrimethoxysilane containing coating composition. The coating composition containing poly(1H,1H,2H,2H-perfluorooctyl-functional siloxane) oligomer F had good corrosion resistance to acetone, toluene, MEK, methanol, 0.1 N aqueous HCl and 0.1 N KOH, but HFE7100 appeared to attack or remove the oligomer F from the surface.

As illustrated in Table 2, the coating compositions comprising the poly(1H,1H,2H,2H-perfluorooctyl-functional siloxane) oligomers A to F provided for a more oleophilic surface than the no silane control, or the 1H,1H,2H,2H-perfluorooctyltrimethoxysilane containing coating composition, and as indicated by the higher hexadecane contact angles, before and after exposure to corrosive chemicals. The coating compositions comprising the poly(1H,1H,2H, 2H-perfluorooctyl-functional siloxane) oligomers A to F are more chemical resistant towards HFE7100, acid, and base than the no silane control, or the 1H,1H,2H,2H-perfluorooctyltrimethoxysilane containing coating composition.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of an oligomer derived from a fluoroalkyl silane, methods of making such oligomers, coating compositions comprising such oligomers, and coatings formed from such compositions. Modifications may occur to those skilled in the art and to those who may make and use the invention. The disclosed embodiments are merely for illustrative purposes and not intended to limit the scope of the invention or the subject matter set forth in the claims.

What is claimed is:

1. A poly(fluoroalkyl-functional siloxane) oligomer having the general formula (I):

$$T^1_a T^2_b T^3_c \quad (I)$$

wherein $T^1$ is independently $R^F$-Q-SiX$_2$O$_{1/2}$;

$T^2$ is independently $R^F$-Q-SiXO$_{2/2}$;

$T^3$ is independently $R^F$-Q-SiO$_{3/2}$;

each $R^F$ is independently $C_nF_{(2n+1)}$ group where n is from 1 to 16;

each Q is independently a divalent linear or branched alkylene group containing from 1 to 6 carbon atoms or a divalent linear or branched alkylene group containing from 1 to 6 carbon atoms and an oxygen atom to form an ether group or an oxo group and amino group to form an amidoalkylene group;

each X is independently a hydroxy group or a hydrolyzable group; and where the oligomer of formula (I) is selected from:

(a) a branched poly(fluoroalkyl-functional siloxane) oligomer wherein a is equal to 2+c, b is form 1 to 10, and c is from 1 to 10;

(b) a monocyclic poly(fluoroalkyl-functional siloxane) oligomer wherein a is an integer from 1 to 10, b is an integer from 1 to 10, and c is equal to a; or (c) a polycyclic poly(fluoroalkyl-functional siloxane) oligomer of the formula (IV):

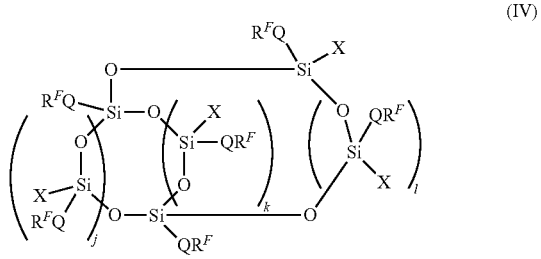

(IV)

wherein
each $R^F$ is $C_nF_{(2n+1)}$ group where n is from 1 to 16;
Q in formula (IV) is a divalent linear or branched alkylene group containing from 1 to 6 carbon atoms;
X in formula (IV) is independently a hydroxy group or an alkoxy group containing 1 to 6 carbon atoms; and
j is an integer from 1 to 5, k is an integer from 0 to 5, and l is an integer from 0 to 5, with the proviso that the sum of j+k+l is from 2 to 10;
with the provisos that
(i) a half oxygen atom bonded to one silicon atom in a $T^1$, $T^2$, or $T^3$ unit is paired with a half oxygen atom bonded to a different silicon atom in a $T^1$, $T^2$, or $T^3$ unit to form a Si—O—Si bond; and
(ii) the sum of a+b+c is from 5 to 32.

2. The poly(fluoroalkyl-functional siloxane) oligomer of claim 1, wherein each $R^F$ in T1, T2, and T3 is independently selected from groups consisting of $CF_3$—, $CF_3(CF_2)_2$—, $CF_3(CF_2)_3$—, $CF_3(CF_2)_4$—, $CF_3(CF_2)_5$—, $CF_3(CF_2)_6$— and $CF_3(CF_2)_7$—.

3. The poly(fluoroalkyl-functional siloxane) oligomer of claim 1, wherein each X in $T^1$, $T^2$, and $T^3$ is independently selected from a hydroxy group or an alkoxy group containing 1 to 6 carbon atoms.

4. The poly(fluoroalkyl-functional siloxane) oligomer of claim 1, wherein each Q in $T^1$, $T^2$, and $T^3$ is independently selected from —$(CH_2)_2$—, —$CH_2CH(CH_3)$—, —$(CH_2)_3$— or —$(CH_2)_4$—.

5. The poly(fluoroalkyl-functional siloxane) oligomer of claim 1, wherein the branched poly(fluoroalkyl-functional siloxane) oligomer (a) has the general formula (II):

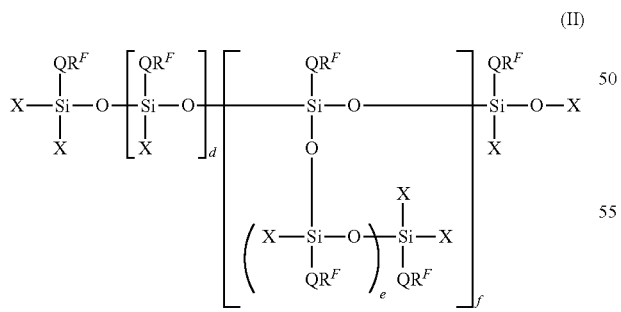

(II)

wherein
each $R^F$ is independently $C_nF_{(2n+1)}$ group where n is from 1 to 16;
each Q is independently a divalent linear or branched alkylene group containing from 1 to 6 carbon atoms;
each X is independently a hydroxy group or an alkoxy group containing 1 to 6 carbon atoms; and d is an integer from 1 to 10, each e is independently an integer from 0 to 2, and f is an integer from 1 to 10, wherein d+(e·f) is from 1 to 10.

6. The poly(fluoroalkyl-functional siloxane) oligomer of claim 5, wherein the oligomer is of the formula:

$X_2Si(QR^F)O$—$[SiX(QR^F)O$—$][Si(QR^F)(OSi(QR^F)X_2)O$—$]Si(QR^F)X_2$, where each $QR^F$ is 1H,1H,2H,2H-perfluorooctyl and each X is methoxy;

$X_2Si(QR^F)O$—$[SiX(QR^F)O$—$]_2[Si(QR^F)(OSi(QR^F)X_2)O$—$]Si(QR^F)X_2$; where each $QR^F$ is 1H,1H,2H,2H-perfluorooctyl and each X is methoxy;

$X_2Si(QR^F)O$—$[SiX(QR^F)O$—$][Si(QR^F)(OSi(QR^F)X_2)O$—$][SiX(QR^F)O$—$]Si(QR^F)X_2$; where each $QR^F$ is 1H,1H,2H,2H-perfluorooctyl and each X is methoxy;

$X_2Si(QR^F)O$—$[SiX(QR^F)O$—$][Si(QR^F)(OSi(QR^F)X_2)O$—$]Si(QR^F)X_2$, where each $QR^F$ is 1H,1H,2H,2H-perfluoropropyl and each X is ethoxy;

$X_2Si(QR^F)O$—$[SiX(QR^F)O$—$][Si(QR^F)(OSi(QR^F)X_2)O$—$]Si(QR^F)X_2$, where each $QR^F$ is 1H,1H,2H,2H-perfluorohexyl and each X is methoxy;

$X_2Si(QR^F)O$—$[SiX(QR^F)O$—$][Si(QR^F)(OSi(QR^F)X_2)O$—$] 2 [SiX(QR^F)O$—$]Si(QR^F)X_2$; where each $QR^F$ is 1H,1H,2H,2H-perfluorooctyl and each X is methoxy; or $X_2Si(QR^F)O$—$[Si(QR^F)(OSi(QR^F)X_2)O$—$][SiX(QR^F)O$—$][Si(QR^F)(OSi(QR^F)X_2)O$—$][SiX(QR^F)X_2$;

where each $QR^F$ is 1H,1H,2H,2H-perfluorooctyl and each X is methoxy.

7. The poly(fluoroalkyl-functional siloxane) oligomer of claim 1, wherein the monocyclic poly(fluoroalkyl-functional siloxane) oligomer (b) has the general formula (III):

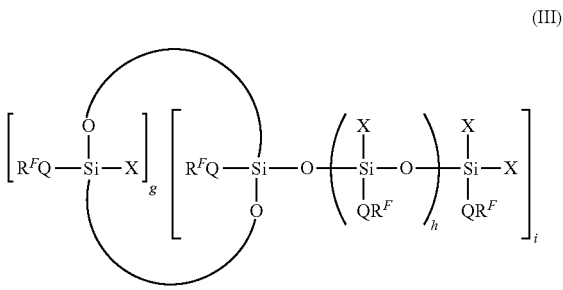

(III)

wherein
each $R^F$ is independently a $C_nF_{(2n+1)}$ group where n is from 1 to 16;
each Q is independently a divalent linear or branched alkylene group containing from 1 to 6 carbon atoms;
each X is independently a hydroxy group or an alkoxy group containing 1 to 6 carbon atoms; and
g is an integer from 1 to 5, each h is independently an integer from 0 to 5, and i is an integer from 1 to 5, with the provisos that the number of $[Si(QR^F)XO$—$]$ repeat units is from 1 to 10 and the sum of g+i is from 3 to 10.

8. The poly(fluoroalkyl-functional siloxane) oligomer of claim 7, wherein said oligomer is of the formula:

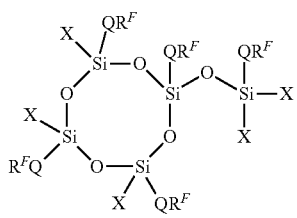
(III-a)

where each QR$^F$ is 1H,1H,2H,2H-perfluorooctyl and each X is methoxy;

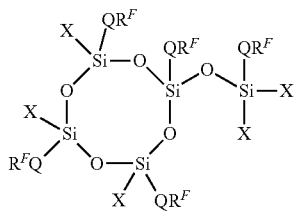
(III-b)

where each QR$^F$ is 1H,1H,2H,2H-perfluoropropyl and each X is ethoxy;

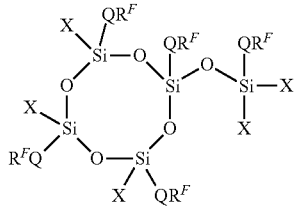
(III-c)

where each QR$^F$ is 1H,1H,2H,2H-perfluorohexyl and each X is ethoxy;

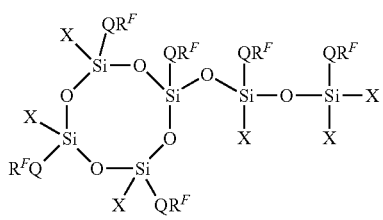
(III-d)

where each QR$^F$ is 1H,1H,2H,2H-perfluorooctyl and each X is methoxy; or

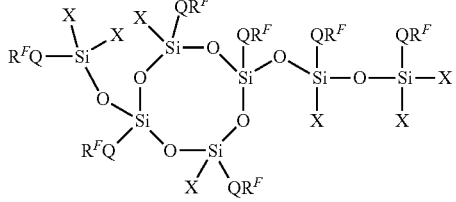
(III-e)

where each QR$^F$ is 1H,1H,2H,2H-perfluorooctyl and each X is methoxy.

9. The poly(fluoroalkyl-functional siloxane) oligomer of claim 1, wherein said polycyclic poly(fluoroalkyl-functional siloxane) oligomer is of the formula:

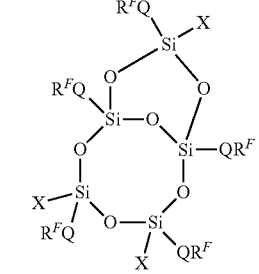
(IV-a)

where each QR$^F$ is 1H,1H,2H,2H-perfluorooctyl and each X is methoxy;

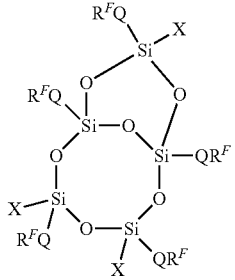
(IV-b)

where each QR$^F$ is 1H,1H,2H,2H-perfluoropropyl and each X is ethoxy;

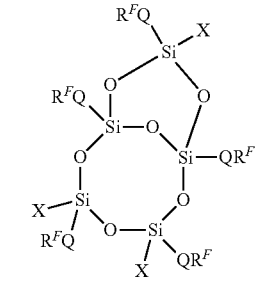
(IV-c)

where each QR$^F$ is 1H,1H,2H,2H-perfluorohexyl and each X is ethoxy;

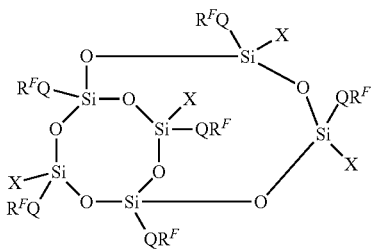

(IV-d)

where each $QR^F$ is 1H,1H,2H,2H-perfluorooctyl and X is methoxy;

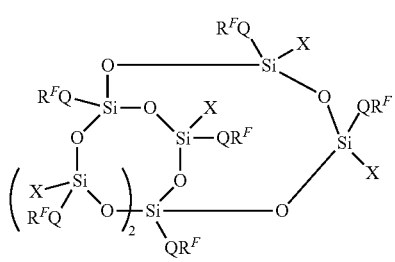

(IV-e)

where each $QR^F$ is 1H,1H,2H,2H-perfluorooctyl and each X is methoxy; or

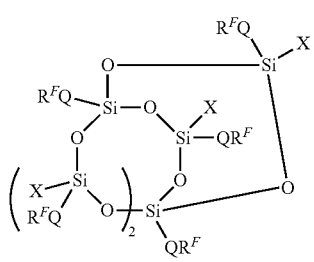

(IV-f)

where each $QR^F$ is 1H,1H,2H,2H-perfluorooctyl and each X is methoxy.

10. A process for preparing the reactive poly(fluoroalkyl-functional siloxane) of claim 1, wherein said process comprises reacting at least one fluoroalkyl-functional silane of formula (V):

$$R^FQ\text{-}SiX_3 \quad (V)$$

wherein
each $R^F$ is independently a $C_nF_{(2n+1)}$ group where n is from 1 to 16;
each Q is independently a divalent linear or branched alkylene group containing from 1 to 6 carbon atoms or a divalent linear or branched alkylene group containing from 1 to 6 carbon atoms and an oxygen atom to form an ether group or an oxo group and amino group to form an amidoalkylene group;
each X is independently a hydroxy group or a hydrolyzable group, with water, where the mole ratio of water to the silane of formula (V) is about 0.5:1 to 8:1, to provide for the reactive poly(fluoroalkyl-functional siloxane) oligomer having the general formula (I) selected from:
the branched poly(fluoroalkyl-functional siloxane) oligomer (a);
the monocyclic poly(fluoroalkyl-functional siloxane) oligomer (b); or
the a polycyclic poly(fluoroalkyl-functional siloxane) oligomer (c) of the formula (IV).

11. The process of claim 10, wherein the molar ratio of water to the fluoroalkyl-functional silane of formula (V) is about 0.5:1 to 6:1.

12. The process of claim 11, wherein the molar ratio of water to the fluoroalkyl-functional silane of formula (V) is about 0.75:1 to 2:1.

13. The process of claim 10, where the process further comprises a catalyst.

14. The process of claim 13, wherein the catalyst is selected from an acid, a base, a metal salt or a metal complex, an acid catalyst, an alkali catalyst, an organic amine catalyst, or a combination of two or more thereof.

15. The process of claim 14, wherein the catalyst is selected from hydrochloric acid, nitric acid, acetic acid, sulfuric acid, phosphoric acid, sulfonic acid, methanesulfonic acid, p-toluenesulfonic acid, sodium hydroxide, potassium hydroxide, ammonia, triethylamine, titanium isopropoxide, or dibutyltin dilaurate, and the catalyst is present in an amount of from about 10 to about 10,000 parts per million (ppm) based on the weight of the fluoroalkyl-functional silane of formula (V).

16. A coating composition comprising the reactive poly(fluoroalkyl-functional siloxane) oligomer of claim 1 and optionally at least one other coating additive.

17. A substrate comprising the coating composition of claim 16 disposed on at least a portion of a surface thereof.

* * * * *